(12) United States Patent
Sakai et al.

(10) Patent No.: US 6,309,562 B1
(45) Date of Patent: Oct. 30, 2001

(54) ARTIFICIAL STONE

(75) Inventors: Mieko Sakai, Tokyo; Kenichiro Saito, Chiba, both of (JP)

(73) Assignee: Doppel Co., Ltd., Tokyo (JP)

( * ) Notice: Subject to any disclaimer, the term of this patent is extended or adjusted under 35 U.S.C. 154(b) by 0 days.

(21) Appl. No.: 09/600,475

(22) PCT Filed: Jan. 16, 1998

(86) PCT No.: PCT/JP98/00145

§ 371 Date: Sep. 11, 2000

§ 102(e) Date: Sep. 11, 2000

(87) PCT Pub. No.: WO99/36370

PCT Pub. Date: Jul. 22, 1999

(51) Int. Cl.$^7$ .................................................. C04B 26/02
(52) U.S. Cl. ................ 252/301.36; 252/301.26; 252/301.21
(58) Field of Search .................. 428/15; 252/301.36, 252/301.26, 301.21, 301.34

(56) References Cited

U.S. PATENT DOCUMENTS 6,136,226 * 10/2000 Sakai .............................. 252/301.36
6,146,548 * 11/2000 Sakai .............................. 252/301.36

* cited by examiner

*Primary Examiner*—Alexander S. Thomas
(74) *Attorney, Agent, or Firm*—Wenderoth, Lind & Ponack, L.L.P.

(57) ABSTRACT

An artificial stone which comprises a molded artificial stone body formed out of inorganic aggregate and a resin as main components, the inorganic aggregate containing at least as a part thereof a luminescent, fluorescent or noctilucent substance and a transparent inorganic aggregate, or a transparent inorganic aggregate with the luminescent, fluorescent or noctilucent substance baked on the surface thereof, 0.5–3.5 wt. % of an organic nitrogen-containing compound with respect to a total quantity of a product being compounded into the molded body.

5 Claims, No Drawings

ARTIFICIAL STONE

This application is a 371 of PCT/JP98/00145 filed Jan. 16, 1998.

TECHNICAL FIELD OF THE INVENTION

The invention of the present application relates to an artificial stone. In further detail, the invention of the present application relates to a luminous artificial stone having light regenerating function or luminous noctilucent function, which exhibits excellent luminance and durability of luminance, useful as building materials, view improving materials and the like; more specifically, for instance, as ornaments visible in night or in dark field environments, e.g., direction indicators, position guides, etc.

BACKGROUND OF THE INVENTION

Artificial stones well known in the art are produced by mixing crushed naturally occurring stones with resin and solidifying the resulting product. Further, various improvements have been made to these artificial stones in order to obtain products having the appearance like a naturally occurring stone such as a marble, a granitic stone, etc., and yet having excellent hardness and strength As an attempt to improve the function and performance of the artificial stones above, there is proposed to impart alight-emitting function by using a luminescent or fluorescent substance or a light-emitting substance such as a light-storing material. As such attempts, there is proposed a method comprising solidifying a mixture obtained by mixing a phosphorescent substance with a resin component which is used as the binder of an artificial stone, or a method comprising constituting the artificial stone by mixing a light-storing fluorescent substance or an ultraviolet fluorescent substance, e.g., strontium aluminate, with an unsaturated polyester, a methacrylic resin, a glass, etc., and after solidifying the resulting mixture, crushing it to provide aggregates for the artificial stone.

However, the luminescent or fluorescent artificial stones known heretofore obtained by either of the methods above are based on the phosphorescent function of tie light-storing materials and the like, and are yet to be improved in initial brightness or in the durability of the brightness. From the viewpoint of practical disaster prevention, it has been demanded an artificial stone still improved in luminance and having a longer lasting luminance.

In the conventional artificial stones, moreover, the effective phosphorescent function was available only from the exposed surface portions of the resin components or the aggregates, and not from the light-storing materials or the fluorescent substance incorporated inside the molding of the artificial stone. However, a fluorescent substance such as a light-storing material and the like are extremely expensive, and even a small amount of addition of such fluorescent substance greatly increases the product cost of the artificial stone by about three to ten times. Accordingly, such conventional artificial stones produced by internally incorporating the fluorescent substance were costly, and thereby practically unfeasible.

Thus, it has been considered conventionally to provide a light-emitting layer only on the surface portion of the molded artificial stone, or only to the guiding figures or patterns; however, the local allocation of the light-storing material and the like further makes it difficult to improve the brightness and the durability of the brightness. Moreover, since the light-emitting layer of a conventional type is inferior in adhesive strength with the base material and is poor in resistance against abrasion, it has been found to suffer problems of not exhibiting the desired function, particularly when used in floorings, due to the separation, peeling off, wear, etc., of the light-emitting layer.

Accordingly, even in case the light-storing substance is used only for the figures and patterns, there was still a demand of realizing a novel type of artificial stone still excellent in its phosphorescent luminance and durability of the luminance, and yet improved in adhesiveness and integration with the base material of the light-emitting layer and in mechanical properties such as the resistance against abrasion, etc., suitable for use as, for instance, a light guide under a dark field environment or an ornamental material in night time.

DISCLOSURE OF THE INVENTION

In order to solve the problems above, the invention according to the present application provides an artificial stone which comprises, with respect to a total quantity of the product, 82–93 wt. % of inorganic aggregate and 7–18 wt. % of resin as main components, wherein the inorganic aggregate contains at least as a part thereof a luminescent, fluorescent or noctilucent substance and a transparent inorganic aggregate, or a transparent inorganic aggregate with the luminescent, fluorescent or noctilucent substance baked on the surface thereof, and the product further contains 0.5–3.5 wt. % of an organic nitrogen-containing compound with respect to a total quantity of a product being compounded into the molded body.

Furthermore, the present invention provides an artificial stone as described above, wherein the organic nitrogen-containing compound is an amine, preferably a cyclic amine, and more preferably, a cyclic amine containing a carbonyloxy (—CO—O—) group.

The composition of the artificial stone according to the present invention is described first. As the main components, the artificial stone contains an inorganic aggregate and a resin. For the inorganic aggregate usable in the present invention, usable are those selected from a wide range of materials, such as naturally occurring stones, naturally occurring minerals, artificially synthesized inorganic materials, glasses, metals, etc.

The quantity of the inorganic aggregate incorporated into the product accounts for 82 to 93 wt. % of the total amount of the product. On the other hand, the resin accounts for 7 to 18 wt. % with respect to the total quantity of the product. The sum (total) of the both components accounts for less than 99.5 wt. % of the total quantity of the product.

What is most important in the present invention is that, in the light-emitting portion, at least a part of the aforementioned inorganic aggregate contains a light luminescent, fluorescent or noctilucent substance and a transparent inorganic aggregate, or a transparent inorganic aggregate having a surface coating layer comprising a luminescent, fluorescent or noctilucent substance.

In case a transparent inorganic aggregate is incorporated together with the luminescent, fluorescent or noctilucent substance, the weight ratio of these components is in a range of from 1:2 to 1:200, and the total of both accounts for 82 to 93 wt. % of the total composition of the light-emitting portion.

Further, a transparent inorganic aggregate provided with a surface baked coating using the luminescent, fluorescent or noctilucent substance can be incorporated into the light-emitting portion.

The requirements above are first to be defined concerning the mechanical properties such as the resistances against peeling off, dropping off, and abrasion, as well as the phosphorescence with respect to the light-emitting properties.

As the preferable inorganic aggregates, there can be mentioned a combination of the following two types. More specifically, one is the small inorganic particles ranging from 5 to 70 mesh (based on Tyler sieves), i.e., a component consisting of small particles of inorganic materials properly selected from, for instance, a mineral such as a quartzite, an olivine, a feldspar, a mica, etc.; a naturally occurring rock such as a granite, a metamorphic rock, etc.; a china, a glass, a metal, etc.

Furthermore, a component of fine particles passing through a 100-mesh sieve (based on Tyler sieves) is favorably used together with the component of small particles above. As the fine particle component, there can be mentioned, for instance, a fine particle component selected from various types of naturally occurring or artificial materials. More specifically, usable are the readily available fine particle component such as the powders of calcium carbonate, aluminum hydroxide, silicic stones, etc.

As a part of the fine particle component above, there can be incorporated a component for adjusting the color tone, such as manganese dioxide, titanium dioxide, zirconium silicate, iron oxide, etc.; or a component for rendering the product non-flammable/non-combustible, such as antimony trioxide (pentaoxide), a boron compound, a bromine compound, etc.

The small particle component above functions mainly to influence the external appearance and the mechanical properties of the resulting artificial stone molding. The fine particle component consists of particles far smaller in size as compared with those passing through a 100-mesh sieve constituting the small particle component, and the fine particles intrude into the spaces among the individual particles of the small particle component to fill in the interstices, thereby contributing to the establish properties such as hardness and flexibility. The small particle component and the fine particle component are preferably blended at a ratio by weight of 0.5:1 to 5:1, more preferably, 1:1 to 4:1.

In case the small particle component and the fine particle component are incorporated in combination to constitute the artificial stone molding according to the present invention, the constitution of the light-emitting portion can be considered as follows.

<A> In case of using a luminescent, fluorescent or noctilucent substance and a transparent inorganic aggregate as a part of the inorganic aggregate, it is preferred that the transparent inorganic aggregate is used at least as a part of the small particle component, while using the luminescent, fluorescent or noctilucent substance at least as a part of the fine particle component.

With respect to the small particle component that is used as the transparent inorganic aggregate, it signifies that the small particle component is an inorganic component substantially having a high light-transmittance. Although there are various degrees in transparency, the naturally occurring or artificially synthesized inorganic substances having a relatively high light transmittance are used in the present invention. Accordingly, the transparent inorganic small particle component may be colored, or may be in a state having the intrinsic color.

Representative examples which can be mentioned for use as the transparent inorganic small particle component include quartz stones, quartzites, glasses, etc., but are not only limited thereto.

In the present invention, a luminous component having a light-storing function consisting of particles passed through 100-mesh sieves is incorporated as a part of the fine particle component. Representative examples of such components include a light-storing material based on strontium aluminate and zinc sulfate, etc. These various types of materials can be used in the present invention.

As the inorganic small particle component which functions as the aggregate of the artificial stone, as described above, used are the particles ranging from 5 to 70 mesh in size. This is a preferred requirement when the small particle component is used in combination with the inorganic fine particle component.

Concerning the inorganic components described above, not only the size, but also the blend ratio thereof is an important factor in the present invention.

More specificaiy, concerning the component of the artificial stone of the present invention, the weight of the inorganic small particle component ($W_1$), the weight of the inorganic fine particle component ($W_2$), and the weight of the luminescent, fluorescent or noctilucent component having light-storing function and light-emitting function ($W_3$) above preferably satisfy a relation expressed as follows:

$W_1:(W_2+W_3)=0.5:1\sim5:1$ $W_3/W_2 \geq 1/50$

Concerning the ratio $W_1:(W_2+W_3)$, more preferably is in a range of about 1:1 to 4:1.

Further, for the inorganic small particle component, as described above, the weight of the transparent inorganic small particle component preferably satisfies the following relation;

$(0.5\sim1.0)W_1$

The requirements above are desired to realize the physical properties such as strength, hardness, density, etc. necessary for an artificial stone, as well as the optical function, i.e., a regenerative luminance, of the artificial stone according to the present invention.

The size of the particles constituting each of the components is properly selected depending on the size and the blending ratio of the component to be used in combination, however, in general, it is preferred that the fine particle e component and the luminescent, fluorescent or noctilucent component having light-storing function and light-emitting function consist of particles about 150 to 325 mesh in size.

The light-storing function and light-emitting function of the artificial stone is described in further detail below. In the artificial stone according to the present invention, the light-storing function and light-emitting function is effectively realized to provide an artificial stone having a luminescent, fluorescent or noctilucent properties by:

1) A transparent inorganic small particle component is incorporated for 50 to 100 wt. % of the inorganic small particle component; and
2) The luminescent, fluorescent or noctilucent component consisting of particles passing through 100-mesh sieve is incorporated at a ratio specified above. By realizing the regenerative artificial stone by satisfying the characteristics above, the light emission is implemented with a portion having a thickness. That is, unlike the conventional products, the light-emitting function is not limited only to the surface layer, but the light is emitted from over the entire thickness of the artificial stone Thus, there is provided an artificial stone having excellent luminescent or fluorescent performance and economically superior concerning the use of the expensive regenerative luminance component.

The reason for above can be explained as follows. By using the transparent inorganic small particle component as the transparent aggregates, the light irradiated from the exterior can be transmitted and intruded into the interior of the artificial stone, and the light can then be efficiently absorbed by the luminescent or the fluorescent component; furthermore, by providing a light-emitting layer comprising dispersed therein the luminescent component made from the light-storing material with a sufficient thickness, a high luminance can be maintained for a long duration of time. Thus, since the transparent inorganic small particle component has excellent light transmittance, a high brightness can be realized at the time of emitting light.

As described above, the transparent component preferably accounts for 30 to 100 wt. % with respect to the entire small particle component. Needless to say, however, it is preferred from the viewpoint of phosphorescent function that the transparent component accounts for 100% concerning the mechanical properties of the artificial stone such as the strength or the external design. As a matter of course, the constitution of the present invention is not only limited thereto, but it is difficult to achieve the desired optical function in case the transparent component accounts for less than 30%.

<B> In case of using transparent inorganic aggregates having the luminescent, fluorescent or noctilucent substance baked on the surface thereof as a part of the inorganic aggregates, the small particle component may comprise those which at least a part thereof is transparent and having the luminescent, fluorescent or noctilucent substance baked on the surface. In other words, a part or all of the small particle component comprises a transparent inorganic aggregate whose surface is coated with the luminescent, fluorescent or noctilucent substance. As the preferred examples of the small particle component which comprises the transparent inorganic aggregates, there can be mentioned glasses and silicic stones, etc.

Concerning the small particle component to be blended in the composition, it is preferred that the aforementioned transparent inorganic aggregate having the luminescent, fluorescent or noctilucent as a regenerative luminescent substance as the surface coating layer accounts for 10 to 100% (by weight) of the component.

In case of the transparent inorganic aggregate, and in particular, the small particle component having thereon a baked coating, the surface of the particles constituting the transparent small particle component comprises a coating several to several tens of micrometers in thickness, for instance, a coating 5 to 50 $\mu$m in thickness, more preferably, a coating about 20 to 40 $\mu$m in thickness. More specifically, the coating can be formed by baking at a high temperature in a range of from 120 to 1,200° C.

As the substance to be baked, there can be used any of the light storing substance such as strontium aluminate.

The baking can be performed, not only by the various methods known in the art, but by, for instance, mixing the transparent inorganic aggregate, e.g., the small particle component above, into a dispersion or a paste comprising dispersed therein the powder or particles of a light-storing material such as strontium aluminate, followed by drying and baking.

In the present invention, as described above, it is preferred that the size of the particles constituting the inorganic small particle component is specified. More specifically, the inorganic small particle component consists of particles 5 to 70 mesh in sieve size as described above. In case it is desired to, for instance, densely color the upper or the lower portion by using colored particles and colorless particles, there may be used small particles differing in size depending on whether they are colored or not. However, the use of particles differing in size in a large quantity deteriorates the strength of the product and is thereby not preferred.

On the other hand, as described above, the particles constituting the fine particle component are those passed through a 100-mesh sieve, because they should be sufficiently incorporated among the particles of the small particle component. In further detail, the particles are preferably about 150 to 250 mesh in sieve size.

What is important in the high density artificial stone according to the present invention, apart from some exceptions, is that the inorganic aggregate component is preferably dispersed uniformly in the product.

The resin component can be selected from a wide range of thermosetting resins.

More specifically, there can be exemplified an acrylic resin, a methacrylic resin, an unsaturated polyester resin, an epoxy resin, or a copolymer thereof. From the viewpoint of transparency, hardness, strength, etc., particularly preferred among them is a methacrylicresin. As described above, the resin component is preferably blended as such that it may account for 7 to 18 wt. % with respect to the entire composition of the product. The resin component contributes by enclosing the small particle component or the fine particle component which forms the framework and bonding them altogether, and it imparts elasticity or tensile strength to the finished product. The amount of the inorganic aggregate comprising the small particle component and the fine particle component is limited. More specifically, the quantity of the resin component must account for 82% by weight or more, and preferably, 88% by weight or more. However, if the quantity exceeds 93%, the product becomes so brittle as to make the product practically unfeasible. If the quantity is less than 82% by weight, the product becomes so soft as to make it impossible to establish stony properties, and the applicable range of the product becomes similar to that of a resin board.

The above fact signifies that components other than the small particle component and the fine particle component of the naturally occurring stones and the like, i.e., the resin component, should not be present in excess of 18% by weight.

If the resin component should exceed about 18%, the product becomes like plastics, and it no longer is an artificial stone but only nominal. If the quantity of the resin component is excessively reduced, the external appearance of the product can be brought near to a natural color, however, the product becomes so brittle as to make it practically unfeasible. From the aforementioned points of view, the resin component is incorporated, more preferably, at all amount of 9 to 12 wt. %.

In practicing the present invention, the ratio of the constituent components is important. Particularly important is the ratio of the resin component and the other components. The present invention is characterized, in one aspect, in that it enables a high density product having a dense texture. The term "high density" as referred herein signifies that the small particle component and the fine particle component incorporated in the artificial stone product are present in high density, and the degree of this high density can be understood specifically from the density of 2.2 g/cm$^3$ or higher, which exceeds the value of a conventional artificial stone.

Furthermore important in the present invention is that a nitrogen-containing organic compound is incorporated in an amount of 0.5 to 3.5 wt. % with respect to the total quantity of the product.

By blending the nitrogen-containing organic compound at a blending ratio as specified above, the initial phosphorescent brightness of the artificial stone molding according to the present invention can be considerably improved, and the durability thereof becomes distinguished.

As an example of the nitrogen-containing organic compound above, there can be mentioned, for instance, an amine expressed by the following formula:

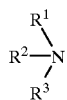

(where, $R^1$, $R^2$, and $R^3$ each represent a hydrogen atom or a hydrocarbon group which may have a substitutional group; all of the $R^1$, $R^2$, and $R^3$ may not be hydrogen atoms at the same time; two of $R^1$, $R^2$, and $R^3$ may combine to form a ring, and the ring may have a substitutional group).

More specifically as the amines above, there can be mentioned a ring-like amine, for instance, a piperidine ring.

As an amine above, there can be used those known as the degradation preventive for a resin to prevent degradation from light or heat. In fact, it has never been anticipated from the prior art technology that the brightness and the durability of the light emission can be greatly improved by adding and blending those substances known as the degradation preventives into the artificial stone composition.

In further detail, the amount of addition of a resin degradation preventive in prior art technology was about 0.01 wt. % with respect to the quantity of resin, however, the addition in such a degree has no effect in improving the brightness or the time duration of maintaining the brightness. On the other hand, a particularly distinguished effect can be obtained when the resin degradation preventive is added in a ratio of 0.5 to 3.5 wt. %, i.e., a quantity corresponding to about 5 to 35 wt. % converted to resin.

Concerning the amines above, those having a carbonyloxy group (—CO—O—) in the molecule there of can be mentioned as an amine having a particular effect. The quantity of addition is in a range of 0.5 to 3.5 wt. % with respect to the total weight of the product, but particularly effective is addition of about 1%.

In the present invention, the outer surface of the artificial stone is preferably polished or surface roughened. This is because it is preferred from the viewpoint of practice that the crushed small particle component is exposed on the surface.

In the present invention, polishing is a practically convenient method for exposing the state of dense texture of the high density artificial stone having an elaborate appearance. As a matter of course, a part of the plane of the product may be polished to expose the small particle component, and the plane having a different appearance from other portions of the plane can be used as a pattern.

In case of producing the artificial stone, it is an important problem how to set the desired color tone and the design. Since it is difficult to obtain products from the naturally occurring stones, the appearance of a granite stone or a marble can be set as one of such targets to achieve because the color and luster thereof are beautiful. In the present invention, it is possible to obtain products having the tone of a granite stone or a marble by using transparent materials for the small particle component, because small particles obtained by crushing naturally occurring stones based on quartz can be used as the small particle component.

The small particles obtained by crushing quartz based naturally occurring stones are mostly colorless and transparent. Even those which are not completely transparent show some light transmitting properties.

By adding an inorganic pigment or an organic pigment such as an azo pigment, a phthalocyanine based pigment, etc., or various types of dyes, the product can be imparted with uniform color having depth and luster.

To obtain a colored artificial stone composition according to the present invention, colored granular particles having the same size as those constituting the small particle component can be mixed as the color component.

The high density artificial stone according to the present invention having the luminescent, fluorescent or noctilucent as well as the excellent color tone properties in ordinary use can be produced in an arbitrary shape, such as sheets, rods, cylinders, etc.

Thus, the artificial stone according to the present invention can be produced by, for instance, a method described below.

More specifically, a luminescent, fluorescent or noctilucent substance and a transparent inorganic aggregate, or a transparent inorganic aggregate having the luminescent, fluorescent or noctilucent substance baked on the surface above are used at least as a part of the inorganic aggregate, and are injected in the shaping mold together with the aforementioned mixture of the resin binder comprising the nitrogen-containing organic compound. Then, the resulting mixture is press solidified and removed out from the mold. If necessary, the molded product may be polished or subjected to a surface roughening treatment by using a water jet and the like to obtain the artificial stone molding.

The hardening can be performed by compression, i.e., by applying a planar pressure of, for instance, about 5 to 100 kgf/cm². During the molding, heating is applied by maintaining the molding at a temperature of about 90 to 140° C. for a duration of about 5 to 20 minutes.

If the compression above is performed by using the mixture of the resin binder for forming the light-emitting portion as protruded portions together with the mixture of the resin binder for forming the substrate, they can be integrated to obtain a monolithic molding in the hardening process. Thus, peeling off or falling down of the light-emitting protrusions can be prevented from occurring. Furthermore, although depending on the composition thereof, the protruded portions can be formed with excellent resistance against abrasion.

The method using the compression molding above is economically advantageous, because it can be used as a molding method effective for mass production similar to the method for producing moldings having a relatively simple shape such as sheet moldings, and because the material loss can be minimized.

There is no particular limitations concerning the means for polishing the surface; accordingly, there can be used a grinding stone, a polishing cloth, a polishing belt, etc., as the tool, or there can be used a polishing agent such as a buff polishing agent, a rubbing compound, etc.

As the abrasives useful for the above, there can be used those having the polishing function such as diamond, boron carbide, corundum, alumina, zirconia, etc., or those having the burnishing function such as tripolyphosphate, dolomite, alumina, chromium oxide, cerium oxide, etc.

Furthermore, in the present invention, the surface of the molded product obtained by molding can be subjected to a surface roughening treatment, such that the fine particle component may be exposed on the surface portion thereof.

As a method for realizing the above, there can be employed a method of selective removal of the resin component. More specifically, for instance, a highly pressurized water can be jetted to the surface of the molding obtained by removing it from the molding mold, thereby processing the as-obtained surface of the molding.

The processing above is not limiting, because it differs depending on various process conditions, such as the thickness, the distance to the nozzle, or the processing method, etc. However for a product having a thickness of 1 to 20 cm, in general, there can be employed a water pressure of about 50 to 1,500 kgf/cm$^2$ from a nozzle provided at a height of about 2 to 50 mm.

There is no particular limitations concerning the nozzle and the system for jetting highly pressurized water. A variety of types thereof can be applied.

By performing the surface processing using a water jet above, there can be realized the planarization or the surface roughening to provide an artificial stone having an elaborate appearance.

By incorporating a resin component, the surface clouding of the product can be prevented from occurring; moreover, the treatment of liquid wastes can be facilitated as compared with the case of employing etching treatment using reagents.

As a matter of course, if necessary, the surface portion can be treated by using an organic solvent to thereby remove the resin component by softening or dissolving it.

The organic solvent for use in the case above can be properly selected in correspondence with the resin component, and mentioned as the examples are a halogenated hydrocarbon such as methylene chloride and chloroform, a carboxylic acid or an ester compound thereof, such as acetic anhydride, ethyl acetate, butyl acetate, etc., or acetone, tetrahydrofuran, DMF, DMSO, etc.

The surface irregularities can be formed on the product by immersing the molding into any of the organic solvents above or by spraying the organic solvent to the molding, and then removing the softened or dissolved resin component from the surface portion.

Otherwise, the resin portion low in hardness can be scratched off by using a wire brush, a cutting means, etc., to form the surface irregularities.

After applying the surface plane treatment by roughening the surface using a variety of means above, the surface is polished as described hereinbefore. Thus, a surface having the particular elaborate appearance with luster and brightness can be realized.

Furthermore, by injecting a mixture of an inorganic aggregate comprising at least partly containing a luminescent, fluorescent or noctilucent substance and a transparent inorganic aggregate, or a transparent inorganic aggregate having the luminescent, fluorescent or noctilucent substance baked on the surface thereof to the grooved portion formed on the surface of the molding, it is possible to produce an artificial stone molding having the light-emitting portion on the thus filled grooved portions.

In the above case again, the hardening by compression molding can be implemented as an embodiment similar to the method described above, and finally, the molding can be similarly polished or subjected to a surface roughening treatment.

For instance, in case of using a transparent inorganic aggregate having surface coated with the luminescent, fluorescent or noctilucent substance as the mixture for resin molding in any of the methods above, it is possible to provide a cross section comprising particles and the coating layer being exposed therein.

In such a case again, an artificial stone having an excellent phosphorescent properties as well as the particular elaborate appearance can be produced.

In other words, in case the luminescent, fluorescent or noctilucent substance is coated by baking on the surface of the small particle component, the particles constituting the small particle component as well as the coating thereof can be exposed as a cross section by applying polishing. In this manner, the light irradiated from the exterior is provided as a light incident to the plane of the thus exposed granular plane comprising the transparent small particles, and reaches the coating substance baked inside the molding In case of a highly transparent resin such as a methacrylic resin, a favorable light transmittance as a whole can be achieved.

In such a case, the incident light intrudes into the internal of the light-emitting, and the interior also emits light.

Accordingly, light can be stored in a short duration of time, and the light-emitting efficiency can be increased. As described above, in the present invention, furthermore, the brightness and the durability thereof can be greatly improved by adding an nitrogen-containing organic compound.

In the practical use of the artificial stone according to the present invention, the color can be matched with the color tone and the view of the surroundings by designing the colorants.

Again, in case color matching is performed, the artificial stone according to the present invention retains the clear distinguishability and recognizability because of the luminescent, fluorescent or noctilucent provided as the predetermined luminous property.

The present invention is described in further detail below by way of examples. It should be understood, however, that the present invention is not only limited thereby.

EXAMPLE

The following composition was hardened at 120° C. by applying pressure of 12 kgf/cm$^2$ for a duration of 20 minutes.

| | |
|---|---:|
| Strontium aluminate light storing material as a luminescent or noctilucent substance. (passed through 250-mesh sieve) | 2.25 wt. % |
| Silicic stone (10 to 50 mesh in granularity) | 62.75 wt. % |
| Pulverized silicic stone(250-mesh in average granularity) | 21–24 wt. % |
| Methyl methacrylate (MMA) | 10.9 wt. % |
| Peroxide-based hardening agent | 0.1 wt. % |
| Nitrogen-containing organic compound (tetrakis(2,2,6,6-tetramethly-4-piperidyl)1,2,3,4-butanetetracarboxylate) | 0–3 wt. % |

Then, the pressed product was removed from the molding mold to obtain ail artificial stone molding 20 mm in thickness.

The surface of the resulting molding was polished by using a diamond based grinding stone.

All of the moldings thus obtained exhibited a luminescent phosphorescence, and showed excellent function as a position guide sign for use under dark vision environment.

A phosphorescent brightness test in accordance with JIS-Z-9100 was performed, and the results as follows were obtained depending on the difference in the quantity of added nitrogen-containing organic compound.

TABLE 1

| Quantity of nitrogen-containing organic compound (wt. %) | Initial brightness (mcd) | Time elapsed to reach 3 mcd (minutes) | Time elapsed to reach 0.3 mcd (minutes) |
| --- | --- | --- | --- |
| 0 | 440 | 90 | 172 |
| 0.01 | 440 | 91 | 172 |
| 0.1 | 441 | 90 | 173 |
| 0.5 | 480 | 105 | 750 |
| 1 | 577 | 120 | 980 |
| 2 | 550 | 112 | 920 |
| 3 | 492 | 100 | 800 |
| 3.5 | 481 | 100 | 720 |
| 4 | 442 | 92 | 173 |

From the results shown in Table 1, it can be understood that by adding the nitrogen-containing organic compound in a quantity of from 0.5 to 3.5 wt. %, preferably, from 1 to 3%, the initial brightness as well as the durability of the luminous brightness are greatly improved.

The artificial stone having added therein 1% of the nitrogen-containing organic compound was found to have a specific gravity of 2.33 (in accordance with JIS K 7112) and a water absorptivity of 0.14%. Furthermore, a bending strength of 63.58 kgf/cm (JIS A 5209) and a hardness of 1,023 kgf/mm$^2$ (JIS Z 2244, Vickers's hardness) were obtained for the product.

Industrial Applicability of the Invention

As described above, the present invention provides a high density artificial stone having excellent luminous properties, a superior color tone having depth and luster, and favorable physical properties.

While the invention has been described in detail by making reference to specific examples, it should be understood that various changes and modifications can be made without departing from the scope and the spirit of the present invention.

What is claimed is:

1. An artificial stone which comprises, with respect to a total quantity of the product, 82–93 wt. % of inorganic aggregate and 7–18 wt. % of resin as main components, the inorganic aggregate containing at least as a part thereof a luminescent, fluorescent or noctilucent substance and a transparent inorganic aggregate, or a transparent inorganic aggregate with the luminescent, fluorescent or noctilucent substance baked on the surface thereof, 0.5–3.5 wt. % of an organic nitrogen-containing compound with respect to a total quantity of a product being compounded into the molded body.

2. An artificial stone as claimed in claim 1, wherein the organic nitrogen-containing compound is an amine.

3. An artificial stone as claimed in claim 2, wherein the organic nitrogen-containing compound is a cyclic amine.

4. An artificial stone as claimed in claim 2, wherein the organic nitrogen-containing compound contains a carbonyloxy group.

5. An artificial stone as claimed in claim 3, wherein the organic nitrogen-containing compound contains a carbonyloxy group.

* * * * *